United States Patent [19]

Solc et al.

[11] 4,414,339

[45] Nov. 8, 1983

[54] LOW DENSITY, ELECTROMAGNETIC RADIATION ABSORPTION COMPOSITION

[75] Inventors: Jitka Solc; Robert F. Harris, both of Midland, Mich.

[73] Assignee: The Dow Chemical Company, Midland, Mich.

[21] Appl. No.: 357,925

[22] Filed: Mar. 15, 1982

[51] Int. Cl.³ ............................ G21K 1/10; G21F 1/10
[52] U.S. Cl. ..................................... 523/137; 524/431; 524/578; 524/785
[58] Field of Search ........................................ 523/137

[56] References Cited

U.S. PATENT DOCUMENTS

| | | | |
|---|---|---|---|
| 3,843,593 | 10/1974 | Shell et al. | 523/137 |
| 3,981,844 | 9/1976 | Romankiw | 252/62.51 R |
| 4,012,738 | 3/1977 | Wright | 343/18 A |
| 4,030,098 | 6/1977 | Nahmias | 343/18 A |
| 4,038,660 | 7/1977 | Connolly et al. | 343/18 A |
| 4,116,906 | 9/1978 | Ishino et al. | 523/137 |
| 4,206,094 | 6/1980 | Yen et al. | 260/8 |

FOREIGN PATENT DOCUMENTS

| | | | |
|---|---|---|---|
| 43040 | 1/1982 | European Pat. Off. | 523/137 |
| 52-127829 | 8/1977 | Japan. | |
| 53-27802 | 3/1978 | Japan. | |
| 54-121046 | 2/1979 | Japan. | |
| 54-61239 | 5/1979 | Japan. | |

OTHER PUBLICATIONS

Chemical Engineering, Jun. 11, 1962, "Characteristics of Fine Particles", p. 207.

*Primary Examiner*—Joseph L. Schofer
*Assistant Examiner*—N. Sarofim

[57] ABSTRACT

Low density compositions containing colloidal-size particulates of an ELM absorber such as $Fe_3O_4$ and a particulate of an ELM attenuator such as carbonyl iron dispersed in a dielectric matrix such as a styrene/butyl acrylate copolymer provide improved absorption of electromagnetic radiations.

12 Claims, No Drawings

LOW DENSITY, ELECTROMAGNETIC RADIATION ABSORPTION COMPOSITION

BACKGROUND OF THE INVENTION

This invention relates to a composition for suppressing electromagnetic radiation and, particularly, for reducing the reflection of microwave energy.

The use of materials for absorbing electromagnetic radiation is wide spread in the coating of (1) military devices which are required to avoid or minimize detection by radar, (2) appliances that employ microwave radiation, and (3) reflectors of ships, airplanes, building and bridges to reduce reflection that often causes navigational errors.

Many materials including natural ones and synthetic ones are known for their ability to surpress electromagnetic radiation in the microwave frequency range. This ability to suppress electromagnetic radiation enables the absorbing material to dissipate electromagnetic energy within the material, thereby reducing the reflection of microwaves.

Of the various absorbing materials, the artificial dielectrics are the most commonly employed. Artificial dielectrics are generally formed by dispersing a magnetic powder or other natural absorber in a dielectric material, such as plastics including thermoplastics and thermosets, ceramics, waxes and the like. The artificial dielectrics which have been formed by loading the aforementioned dielectric binders with magnetic metals, semi-conductors, ferromagnetic oxides or ferrites have very desirable magnetic and dielectric properties.

The use of solid ferrites, i.e., ferromagnetic ferrites formed of ferric oxide and other bivalent metal oxides, as sheet materials for reflecting surfaces and objects to suppress or substantially reduce the reflection of electromagnetic energy offers many advantages. It has been found that mixed ferrites often provide good absorptive materials over a wide range of microwave frequencies. In addition, ferrites in the form of solid coatings display the higher permeabilities which are required for broad band operation. Such solid ferrite coatings are capable of higher permeabilities than those exhibited by the ferrite powders since the magnetic properties of ferrite decline appreciably by grinding it into powder form. Thus, it is found that ferrites that are both non-conductive and ferromagnetic provide within a single composition the potentially optimum dielectric and magnetic properties.

Unfortunately, it is found that, in the conventional absorptive coatings that contain ferrites, substantial quantities of the heavy ferrites is required in order to achieve the desired absorptive capability. The resulting dense coatings of such conventional absorbers are generally undesirable because they are heavy and difficult to fabricate.

In view of the aforementioned deficiencies of the prior art materials for absorbing electromagnetic radiation, it is highly desirable to provide a lightweight absorptive material that can be readily fabricated into any shape or applied as a coating to any of a variety of substrates which coatings contain relatively low concentrations of the heavy magnetic particles needed for absorption.

SUMMARY OF THE INVENTION

The present invention is such a low density ELM absorption composition which exhibits high efficiency in the absorption of electromagnetic radiation, particularly at microwave frequencies. Such composition (hereinafter called ELM compositions) comprises (1) a dielectric material (hereinafter called dielectric matrix) having dispersed therein (2) a colloidal-size particulate of a material capable of absorbing electromagnetic radiation (hereinafter called ELM absorber) and (3) a particulate of a metal-containing material capable of providing increased attenuation of electromagnetic radiation (hereinafter called ELM attenuator). The concentration of ELM absorber in the ELM composition is advantageously sufficient to provide a magnetic loss tangent greater than 0.05 at a frequency of 2 gegahertz (gHz) and a composition thickness of 2 centimeters (cm). The concentration of ELM attenuator is sufficient to provide the ELM composition with an attenuation of greater than 0.5 decibels per centimeter (dB/cm) under the aforementioned conditions. For the purposes of this invention, a low density ELM composition has a density less than 6 grams per cubic centimeter (g/cm$^3$). Surprisingly, the low density ELM composition of the present invention exhibits dissipative properties higher than would be expected at the concentrations of ELM absorber being employed.

In another aspect, this invention is a stable fluid dispersion of the aforementioned ELM attenuator and colloidal-sized particles of the dielectric matrix containing colloidal or sub-colloidal particles of the ELM absorber. Surprisingly, such a dispersion can be applied as a coating and dried to form a continuous film wherein the particles of the ELM absorber are maintained in an essentially discrete spaced apart relationship by the dielectric matrix. Preferably, particles of the ELM attenuator are also substantially maintained in an essentially discrete spaced apart relation by the dielectric matrix.

The ELM composition of this invention is particularly effective as an electromagnetic radiation absorber in such applications as paints and coatings to be used for reflection for metal structures such as towers, bridges, ships, etc.; microwave camouflage and radar camouflage; coatings for appliances wherein microwave radiation absorption is desired, such as in microwave ovens and microwave browning devices; applications related to the transport of solar energy from space satellites; and the like. This ELM composition is also well suited for molding shaped articles and for fabrication into foams and fibers.

DETAILED DESCRIPTION OF ILLUSTRATIVE EMBODIMENTS

The low density ELM composition of the present invention has a density, an attenuation and a magnetic loss tangent as defined hereinbefore. Preferred compositions have (1) densities in the range from about 1.2 to about 5, most preferably from about 1.5 to about 3, g/cm$^3$; (2) magnetic loss tangent greater than 0.1, most preferably greater than 0.2 under the conditions specified hereinbefore; and (3) attenuation greater than 1 dB/cm, most preferably greater than about 2 dB/cm.

The ELM compositions comprises three essential components: (1) a dielectric solid matrix acting as the continuous phase for the composition, (2) a particulate ELM absorber that is maintained in an essentially discrete, spaced apart relationship by the matrix and (3) a particulate ELM attenuator. In preferred ELM compositions, the ELM attenuator is also essentially totally dispersed in the dielectric matrix.

The dielectric matrix is suitably any normally solid material capable of serving as an insulating matrix (binder) for the ELM absorber. Preferably, it has an electrical resistivity greater than $10^6$ ohms per centimeter (ohms/cm), more preferably greater than about $10^{10}$ ohms/cm, most preferably from about $10^{15}$ to $10^{20}$ ohms/cm. Examples of such suitable dielectrics include glass, ceramics, waxes, plastics, including thermoplastics and thermosets, rubber polymers and the like, with the synthetic plastics being preferred. Of the synthetic plastics, preferred are polymers that are water-insoluble and are prepared from hydrophobic monomers that are essentially water-immiscible, i.e., the monomer forms a separate phase when 5 grams of the monomer is mixed with 100 grams of water. Such water immiscible will polymerize under emulsion polymerization conditions to form a water-insoluble polymer which will exist in the form of a stable aqueous colloidal dispersion, usually with the aid of suitable surface active agents.

The ELM absorber is a material (1) which absorbs electromagnetic radiation having frequencies in the range from about 0.3 to about 20 gHz and (2) which is in the form of a colloidal or sub-colloidal size particulate. Preferred ELM absorbers can be further characterized as paramagnetic or superparamagnetic due to their small size. Examples of such materials are compounds of magnetic metals such as ferromagnetic oxides or ferrites, e.g., $Fe_3O_4$, as well as ferromagnetic ferrites formed of ferric oxide and various bivalent metal oxides such as metal oxides of nickel, zinc and manganese; magnetic metals such as iron, cobalt and nickel and their alloys; and other known ELM absorbing materials such as carbon black, graphite and the like. The ELM absorber generally contains particles having a maximum dimension less than about 1 micrometer ($\mu$m), preferably in the range from about 0.01 to about 0.7 $\mu$m. Of these materials, the magnetic metallic compounds are preferred, with $Fe_3O_4$ being most preferred.

The ELM attenuator is preferably a ferromagnetic material which is capable of providing microwave attenuation as described hereinbefore. The ELM attenuator is in the form of particles having a dimension greater than 1 $\mu$m, preferably in the range from about 1.5 to about 100 $\mu$m, most preferably from about 2 to about 75 $\mu$m. Examples of such attenuating materials are iron, cobalt, nickel and other ferromagnetic metals as well as alloys of such metals. Of these materials, metallic iron is preferred, with carbonyl iron being most preferred. It is understood, however, that in addition to carbonyl iron, metallic iron made by other procedures such as electrolytic iron, reduced iron and atomized iron are preferred.

In the preparation of the low density, ELM absorbing compositions of this invention, it is advantageous to disperse the ELM absorber into the dielectric matrix such that dielectric matrix forms a continuous phase that maintains the particles of ELM absorber in an essentially discrete, spaced apart relationship. Any of a variety of conventional blending procedures for incorporating a colloidal or sub-colloidal particulate into dielectric binders are suitably employed for this purpose. Preferably, however, the dielectric matrix having the ELM absorber dispersed therein (hereinafter called dielectric/absorber), is prepared by initially forming an aqueous dispersion of the ELM absorber by contacting colloidal or sub-colloidal particles of said absorber with an aqueous solution of a water-soluble surfactant or emulsifier, thereby forming the dispersion which contains from about 5 to about 70 weight percent of the absorber particles. Examples of preferred aqueous dispersions of ELM absorbers are the so-called ferrofluids such as disclosed in the U.S. Pat. No. 3,981,844, preferably those having an average particle diameter in the range from about 0.05 to about 0.1 micrometer. Preferably, such fluids are aqueous dispersions of the magnetic metals which are stabilized by the presence of surfactants, emulsifiers and/or chemical dispersants as described hereinafter.

Typically, suitable surface active agents, dispersants or emulsifiers include salts of fatty acids such as potassium oleate, metal alkyl sulfates such as sodium lauryl sulfate, salts of alkyl aryl sulfonic acids such as sodium dodecylbenzene sulfonate, polysoaps such as sodium polyacrylate and alkali metal salts of methyl methacrylate/2-sulfoethyl methacrylate copolymers and other sulfoalkyl acrylate copolymers, and other anionic surfactants such as the dihexyl ester of sodium sulfosuccinic acid; nonionic surfactants such as the nonionic condensates of ethylene oxide with propylene oxide, ethylene glycol and/or propylene glycol; and cationic surfactants such as alkylamine-guanidine polyoxyethanols, as well as a wide variety of micelle generating substances described by D. C. Blackley in *Emulsion Polymerization*, Wiley and Sons, Chapter 7 (1975) and other surfactants listed in McCutcheon's *Detergents and Emulsifiers*, 1980 Annual North Americal Edition, McCutcheon, Inc., Morristown, N.J. Also included among the suitable surfactants are the surface active polymers (often called polysoaps), e.g., those described in U.S. Pat. No. 3,965,032. Of the suitable surfactants, the anionic varieties such as the potassium salts of functionalized oligomers, e.g., Polywet varieties sold by Uniroyal Chemical, are preferred. Such surface active agents or emulsifiers are employed in amounts sufficient to provide a stable dispersion of the ELM absorber in water. Preferably, such surface active agents are employed in concentrations in the range from about 0.2 to about 10, most preferably from about 1 to about 6, weight percent based on the aqueous phase. Particularly desirable processes for forming such aqueous colloidal dispersions of the ELM absorber are described in U.S. Pat. Nos. 3,826,667; 3,981,844; 3,843,540 and *Industrial Engineering Production and Research Development*, Vol. 19, 147–151 (1980).

The aqueous dispersion of the ELM absorber is then combined with the water-immiscible monomer as described herein to form the desired emulsion by normal mixing procedures, for example, by passing both the dispersion and monomer through a high shear mixing device such as a Waring blender, homogenizer or ultrasonic mixer. Alternatively and preferably, the monomer is added continuously to the aqueous dispersion of the ELM absorber during the polymerization. Advantageously, the monomer is in the form of an aqueous emulsion of the monomer which emulsion is maintained by a water-soluble monomer and/or a water-soluble emulsifier such as described hereinbefore. As another alternative, the aqueous emulsion of the ELM absorber and water-immiscible monomer can be prepared by adding colloidal or subcolloidal particles of the ELM absorber to an existing aqueous emulsion of monomer. In such instances, it is often desirable to add additional emulsifier or surfactant to the emulsion prior to or simultaneous with the addition of the particles of the ELM absorber. In the emulsion of the ELM absorber and water-immiscible monomer in water, the aqueous phase is present in a proportion sufficient to be the continuous phase of the emulsion. The ELM absorber is present in proportions sufficient to provide the dielectric/absorber particulate with the desired dissipative properties. The water-immiscible monomer is present in proportion sufficient to enclose or encapsulate the ELM absorber when polymerized. The emulsifier and/or surface active agent is present to provide an aqueous colloidal emulsion which is sufficiently stable to be subjected to emulsion polymerization conditions. Preferably, the emulsion contains from about 0.1 to about 25 weight percent of ELM absorber, from about 1 to about 30 weight percent of monomer and a remaining amount of the aqueous phase including emulsifier (surfactant), catalyst and the like.

Examples of suitable water-immiscible monomers that can be employed to prepare the aforementioned dielectric/absorber include monovinylidene aromatic monomers such as styrene, vinyl toluene, t-butyl styrene, chlorostyrene, vinylbenzyl chloride and vinyl pyridene; alkyl esters of $\alpha,\beta$-ethylenically unsaturated acids such as ethyl acrylate, methyl methacrylate, butyl acrylate and 2-ethylhexyl acrylate; unsaturated esters of saturated carboxylic acids such as vinyl acetate, unsaturated halides such as vinyl chloride and vinylidene chloride; unsaturated nitriles such as acrylonitrile; dienes such as butadiene and isoprene; and the like. Of these monomers, the monovinylidene aromatics such as styrene and the alkyl acrylates such as butyl acrylate are preferred.

In addition to the aforementioned water-immiscible monomer, relatively minor portions, e.g., less than 10, preferably less than 5, weight percent based on total monomer component, of a water-soluble monomer such as an ethylenically unsaturated carboxylic acid or its salt such as acrylic acid or sodium acrylate; methacrylic acid, itaconic acid and maleic acid; an ethylenically unsaturated carboxamide such as acrylamide; vinyl pyrrolidone; hydroxyalkyl acrylates and methacrylates such as hydroxyethyl acrylate, hydroxypropyl acrylate and hydroxyethyl methacrylate; aminoalkyl esters of unsaturated acids such as 2-aminoethyl methacrylate; epoxy functional monomers such as glycidyl methacrylate; sulfoalkyl esters of unsaturated acids such as 2-sulfoethyl methacrylate; ethylenically unsaturated quaternary ammonium compounds such as vinylbenzyl trimethyl ammonium chloride may be employed. It is critical in the practice of this preferred embodiment, that such water-soluble monomers not be employed in amounts sufficient to render the resulting polymer soluble in water. Particularly effective monomer recipes for the practice of this invention are those containing from about 20 to about 90 weight percent of styrene, from about 10 to about 80 weight percent of alkyl acrylate such as butyl acrylate and from about 0.01 to about 2 weight percent of the unsaturated carboxylic acids such as acrylic acid, with said weight percentages being based on the weight of total monomers.

The emulsion polymerization conditions employed in the practice of this preferred embodiment of the invention are generally those of conventional free-radical type polymerization carried out in the presence of a radical initiator such as a peroxygen compound, an azo catalyst, ultraviolet light and the like. Preferably, such polymerization is carried out in the presence of a water-soluble peroxygen compound at temperatures in the range from about 50° to about 90° C. The emulsion is generally agitated during the polymerization period in order to maintain adequate feed transfer. The concentration of catalyst is normally in the range from about 0.005 to about 8, preferably from about 0.01 to about 5, weight percent based on total momomer. Examples of suitable catalysts include inorganic persulfate compounds such as sodium persulfate, potassium persulfate, ammonium persulfate; peroxides such as hydrogen peroxide, t-butyl hydroperoxide, dibenzol peroxide and dilauroyl peroxide; azo catalysts such as azobisisobutyronitrile, and other common free-radical generating compounds. Also suitable are various forms of free-radical generating radiation means such as ultraviolet radiation, electron beam radiation and gamma radiation. Alternatively, a redox catalyst composition can be employed wherein the polymerization temperature ranges from about 25° to about 80° C. Exemplary redox catalyst compositions include a peroxygen compound as described hereinbefore, preferably potassium persulfate or t-butyl hydroperoxide and a reducing component such as sodium metabisulfite and sodium formaldehyde hydrosulfite. It is also suitable to employ various chain transfer agents such as mercaptans, e.g., dodecyl mercaptan; dialkyl xanthogen disulfides; diaryl disulfides and others listed in Blackley, supra, Chapter 8 in concentrations as described therein.

Following emulsion polymerization, the resulting aqueous dispersion of the particles of dielectric/ELM absorber can be withdrawn from the polymerization vessel and (1) the dispersion is employed as is or (2) the unreacted monomer and other volatiles are removed to form a concentrated dispersion and then used as a paint base for the ELM composition or (3) the dielectric/ELM absorber particulate can be separated from the aqueous continuous phase of the dispersion by conventional means such as spray drying or drying under vacuum. If dried, the dielectric/ELM absorber particulate preferably contains from about 10 to about 80, most preferably from about 15 to about 70, weight percent of the ELM absorber and from about 90 to about 20, most preferably from about 85 to about 30, weight percent of dielectric matrix polymer.

In this preferred embodiment, the dielectric/ELM absorber in the form of an aqueous dispersion or a dry colloidal-size particulate is then combined with the ELM attenuator to provide the desired low density, ELM absorbing composition. Preferably, the ELM attenuator (particulate) is dispersed as an aqueous dispersion of the dielectric/ELM absorber, thereby forming a coating compositions which can be applied to any substrate as desired and dried to a continuous coating capable of absorbing ELM radiation. Alternatively, the ELM attenuator may be encapsulated in a suitably dielectric material as defined hereinbefore prior to combination with the dielectric/ELM absorber. In this alternative embodiment, the ELM attenuator and dielectric/ELM absorber may be in the form of aqueous dispersions and/or in the form of dry powders when combined.

In dry form, the resulting low density, ELM compositions can be fabricated into an article of desired shape by conventional fabrication techniques such as injection or compression molding, extrusion and the like. Alternatively, the ELM composition in the form of a dry powder is dispersed in a nonaqueous liquid and employed as desired, e.g., as a paint base or base for other coating formulations.

Preferred low density, ELM absorbing compositions that employ colloidal-size $Fe_3O_4$ as the ELM absorber and carbonyl iron as the ELM attenuator have an ELM absorber:ELM attenuator weight ratio from about 90:10 to about 40:60, most preferably from about 80:20 to about 55:45. In the preferred ELM compositions, the weight ratio of the sum of ELM absorber and ELM attenuator to the dielectric matrix is from about 85:15 to about 10:90, most preferably from about 70:30 to about 55:45. In addition to the foregoing critical components, these compositions optionally contain other ingredients such as stabilizers, pigments, fillers, blowing agents, corrosion inhibitors and other additives commonly employed in ELM absorbing compositions.

The following examples are given to illustrate the invention and should not be construed as limiting its scope. Unless otherwise indicated, all parts and percentages are by weight.

EXAMPLE 1

A. Preparation of Aqueous Dispersion of $Fe_3O_4$ (ELM Absorber)

An aqueous dispersion of magnetic iron oxide ($Fe_3O_4$) (ELM absorber) is prepared by mixing aqueous solutions of ferric and ferrous salts in amounts to maintain the $Fe^{+3}/Fe^{+2}$ molar ratio at ~2:1. Magnetic iron oxide is then precipitated at 0°-10° C. by rapid addition of 1 N $NH_4OH$ and vigorous agitation until a pH of 9-10 is reached. Immediately thereafter, the dispersant is introduced with agitation to the aqueous medium containing the precipitated iron oxide and the mixture is heated at 90° C. for one hour. During this period, hydrochloric acid is added until the pH of the mixture reaches 7.5. The particles of precipitated iron oxide are washed with deionized water and redispersed in deionized water containing ~0.5 g of a potassium salt of a functionalized oligomer (Polywet KX-4 sold by Uniroyal Chemical) per gram of precipitated iron oxide, by using an ultrasonic probe. Magnetization of the dispersed iron oxide is measured by a Collpits oscillator circuit technique.

B. Preparation of Magnetic Latex (Dielectric/ELM Absorber)

To a 3-neck flask equipped with a stirrer, two addition funnels and a condenser is added a mixture of 507 g of the 28.5 percent solids dispersion of $Fe_3O_4$ (200 gauss and average particle size of less than 0.08 micrometer) and 203 g of deionized water. The mixture is then heated under nitrogen atmosphere to 90° C. while stirring the mixture. At this temperature of 90° C., a monomer stream and an aqueous surfactant stream are separately introduced via the two addition funnels into the flask, each stream being introduced at the rate of ~6 ml/min over a period of 65 minutes. The monomer stream consists of 64 g of styrene, 16 g of butyl acrylate and 3 g of t-butyl hydroperoxide. The aqueous stream consists of 110 g of deionized water, 2.9 g of the potassium salt of a functionalized oligomer ("Polywet KX-4") and 2 g of sodium formaldehyde hydrosulfite. The resulting reaction mixture is stirred and maintained under nitrogen at 90° C. for an additional half hour. The resulting 25 percent solids latex is concentrated by distillation under vacuum to a 30.3 percent solids latex (dielectric/ELM absorber) having dispersed particles with a polymeric as well as magnetic characteristic. The particles of this latex have a narrow particle size distribution and an average particle diameter of 0.11 micrometer as determined by hydrodynamic chromatography. The latex remains stable in an applied magnetic field of 1800 gauss and exhibits properties common to magnetic colloids. For example, such magnetic colloids are magnetizable liquids that are instantly demagnetized upon removal of a magnetic field and levitate an object upon application of a magnetic field. Magnetization of the latex by a Collpits oscillator circuit technique, described by E. A. Peterson et al. in the *Journal of Colloidal and Interfacial Science*, 70, 3 (1977), is estimated to be 135 gauss.

The particles of the latex are recovered by freeze drying the latex at −80° C. under vacuum at 0.5 mm Hg.

C. Preparation of ELM Composition (Dielectric/ELM Absorber/ELM Attenuator)

One ELM composition (Sample No. 1) is prepared by dry blending 50.3 g of a dry powder of the aforementioned latex (55.4 percent dielectric/44.6 percent $Fe_3O_4$) with 33.5 g of carbonyl iron (ELM attenuator) having an average portion size of 3-4 micrometers and sold by GAF Corporation under the trade name Super Fine Special. The blending is carried out on a Brabender mixing apparatus and the resultant blend is then compression molded into flat plates (0.8 cm thickness × 2.6 cm diameter) at 2000 pounds of positive pressure and 230° C. for 2 minutes. The sample is cooled to room temperature and the pressure on the sample is released. The resultant plate of the ELM composition is machined into two flat disks having a diameter of 2.54 cm and a thickness of 0.64 cm and 0.32 cm, respectively.

A second ELM composition (Sample No. 2) is prepared following the foregoing procedure using 56.5 g of the dry powder of the latex and 18.8 g of the carbonyl iron. The sample is similarly blended, molded and fabricated into disks. For purposes of comparison, a third sample (Sample No. C) of dry particles of the latex is molded and fabricated into disks by the foregoing procedure.

All of the foregoing samples are tested for ELM absorption and the results are reported in Table I.

TABLE I

| Sample No. | Components, (1) % $Fe_3O_4$ | Fe | Polymer | Density (2), g/ml | Frequency gHz | Magnetic Permeability | Tangent M | Attenuation dB/cm |
|---|---|---|---|---|---|---|---|---|
| 1 | 26.8 | 40 | 33.2 | 2.57 | 0.3 | 2.662 | 0.173 | 0.262 |
|   |      |    |      |      | 1   | 2.244 | 0.393 | 1.658 |
|   |      |    |      |      | 2.4 | 1.382 | 0.586 | 4.548 |
|   |      |    |      |      | 5   | 1.198 | 0.246 | 3.899 |
|   |      |    |      |      | 8.5 | 1.330 | 0.154 | 4.540 |
| 2 | 33.5 | 25 | 41.5 | 2.16 | 0.3 | 2.210 | 0.177 | 0.224 |
|   |      |    |      |      | 1   | 1.741 | 0.391 | 1.329 |
|   |      |    |      |      | 2.4 | 1.230 | 0.533 | 3.606 |
|   |      |    |      |      | 5   | 0.991 | 0.190 | 2.610 |

TABLE I-continued

| Sample No. | Components, (1) % | | | Density (2), g/ml | ELM Absorption (3) | | |
| --- | --- | --- | --- | --- | --- | --- | --- |
| | $Fe_3O_4$ | Fe | Polymer | | Frequency gHz | Magnetic Permeability | Tangent M | Attenuation dB/cm |
| | | | | | 8.5 | 1.139 | 0.102 | 2.810 |
| C* | 44.7 | 0 | 55.3 | 1.75 | 0.3 | 1.683 | 0.173 | 0.191 |
| | | | | | 1 | 1.509 | 0.305 | 0.957 |
| | | | | | 2.4 | 1.068 | 0.437 | 2.689 |
| | | | | | 5 | 0.849 | 0.176 | 2.197 |
| | | | | | 8.5 | 0.955 | 0.056 | 1.650 |

*Not an example of the invention
(1) Components of composition given in weight percent based on the weight of the composition. Polymer is a copolymer of styrene and butyl acrylate as described hereinbefore.
(2) Density of the compositions on a dry weight basis.
(3) The ELM absorption characteristics are measured by the procedures described in Dielectric Materials and Applications edited by Arthur R. Von Hippel and published by the M.I.T. Press, Massachusetts Institute of Technology, Cambridge, Massachusetts, March, 1966.

As evidenced by the data in Table I, the compositions of the present invention (Sample Nos. 1 and 2) exhibit significantly better attenuation at a given frequency than does the composition of Sample No. C.

What is claimed is:

1. An ELM absorption composition comprising (1) a solid dielectric material having dispersed therein (2) a colloidal-size particulate having a maximum dimension less than about 1 micrometer of an absorber for electromagnetic radiation and (3) a particulate of an attenuator for electromagnetic radiation, said composition further characterized by having a density less than 6 grams per cubic centimeter (g/cm$^3$) and substantially all of the particles of the absorber being maintained in a spaced apart relationship by the solid dielectric.

2. The composition of claim 1 wherein the composition exhibits a magnetic loss tangent greater than 0.05 and an ELM attenuation of greater than 0.5 decibels per centimeter (dB/cm) when the composition having a thickness of 2 centimeters is exposed to electromagnetic radiation having a frequency of 2 gegahertz.

3. The composition of claim 2 which has a density in the range from about 1.5 to about 3 g/cm$^3$ and exhibits a magnetic loss tangent greater than 0.2 and an attenuation greater than 2 dB/cm.

4. The composition of claim 2 wherein the absorber is an oxide of a magnetic metal and the attenuator is a magnetic metal or an alloy containing at least one magnetic metal.

5. The composition of claim 4 wherein the magnetic metal is iron.

6. The composition of claim 5 wherein the absorber is $Fe_3O_4$ having a maximum particle dimension less than 1 micrometer and the attenuator is carbonyl iron having an average particle size greater than 1 micrometer.

7. The composition of claim 6 wherein $Fe_3O_4$ has a maximum particle dimension in the range from 0.01 to about 0.7 micrometer and the carbonyl iron has an average particle size in the range from about 2 to about 40 micrometers.

8. The composition of claim 7 comprising from about 90 to about 15 weight parts of a dielectric synthetic thermoplastic and from about 10 to about 85 weight parts of combined absorber and attenuator wherein the weight ratio of absorber to attenuator is from about 90:10 to about 60:40.

9. The composition of claim 8 wherein the synthetic thermoplastic is a styrene/butyl acrylate copolymer.

10. The composition of claim 8 wherein substantially all of the particles of the absorber and attenuator are maintained in a discrete spaced apart relationship by the thermoplastic.

11. The composition of claim 1 in the form of an aqueous dispersion of (A) the solid dielectric material having the absorber particulate dispersed therein and (B) the attenuator particulate.

12. The composition of claim 1 wherein the absorber particulate has an average particle diameter within the range of from about 0.05 to about 0.1 micrometer.

* * * * *

UNITED STATES PATENT AND TRADEMARK OFFICE
CERTIFICATE OF CORRECTION

PATENT NO. : 4,414,339

DATED : November 8, 1983

INVENTOR(S) : Jitka Solc and Robert F. Harris

It is certified that error appears in the above—identified patent and that said Letters Patent is hereby corrected as shown below:

Col. 2, line 41, "reflection for" should read -- reflection reduction for --.

Col. 3, line 17, "immiscible will" should read -- immiscible monomers will --.

Col. 8, line 35, "having an average portion" should read -- having an average particle --.

Signed and Sealed this

First Day of May 1984

[SEAL]

Attest:

Attesting Officer

GERALD J. MOSSINGHOFF

Commissioner of Patents and Trademarks